DATA TRANSMISSION BY VARIABLE PHASE WITH TWO TRANSMITTED PHASE REFERENCE SIGNALS

Filed March 14, 1963 5 Sheets-Sheet 1

INVENTORS
ROGER L. EASTON
FRANCIS X. DOWNEY
CHARLES H. WEAVER
BY Shelton McAnelly, Agt
Richard C. Reed
ATTORNEY INVENTORS
ROGER L. EASTON
FRANCIS X. DOWNEY
CHARLES H. WEAVER
BY Shelton McAnelly, Agent
Richard C. Reed, Attorney

DATA TRANSMISSION BY VARIABLE PHASE WITH TWO TRANSMITTED PHASE REFERENCE SIGNALS

Filed March 14, 1963 5 Sheets-Sheet 3

INVENTORS
ROGER L. EASTON
FRANCIS X. DOWNEY
CHARLES H. WEAVER
BY Shelton McAnally, Agt
Richard C. Reed, Attorney Dec. 6, 1966 R. L. EASTON ETAL 3,290,440

DATA TRANSMISSION BY VARIABLE PHASE WITH TWO TRANSMITTED PHASE REFERENCE SIGNALS

Filed March 14, 1963 5 Sheets-Sheet 4

INVENTORS
ROGER L. EASTON
FRANCIS X. DOWNEY
CHARLES H. WEAVER

BY Shelton McAnelly, Agent

Richard C. Reed

ATTORNEY

DATA TRANSMISSION BY VARIABLE PHASE WITH TWO TRANSMITTED PHASE REFERENCE SIGNALS
Filed March 14, 1963 5 Sheets-Sheet 5

INVENTORS
ROGER L. EASTON
FRANCIS X. DOWNEY
CHARLES H. WEAVER
BY Shelton McAnelly, Agent
Richard C. Real
ATTORNEY United States Patent Office 3,290,440

Patented Dec. 6, 1966

3,290,440
DATA TRANSMISSION BY VARIABLE PHASE WITH TWO TRANSMITTED PHASE REFERENCE SIGNALS

Roger L. Easton, Oxon Hill, Md., Francis X. Downey, Annandale, Va., and Charles H. Weaver, Washington, D.C., assignors to the United States of America as represented by the Secretary of the Navy Filed Mar. 14, 1963, Ser. No. 265,295
3 Claims. (Cl. 178—67)

The invention described herein may be manufactured and used by or for the Government of the United States of America without the payment of any royalties thereon or therefor.

This invention relates to information transmission systems in general and in particular to systems for handling a plurality of information signals in a single transmission link.

In certain situations involving the multiplexing of information for transmission between two points, the use of conventional telephone lines is desirable.

To fulfill the usual desire for capability of simultaneously transmitting a plurality of conversations between the two points it is not unusual practice at present for multiplexing to be employed on the telephone lines by the owner or operator which may be called simply "Telephone Company." In the Telephone Company multiplex scheme it is conventional to use on the same lines a plurality of sub-carriers with suitable mixing and demodulation equipment to provide a plurality of channels with a frequency band of 300 to 3000 cycles per second which is adequate for voice communication.

When one desires to use one channel of such a line for additional multiplexed communication as in the subject of the present invention, not only should it be obvious that the provision of several channels in such a narrow band as 2700 cycles has definite limitations or problems but also it is seen that consideration must be given to certain stability problems inherent in a mixer-oscillator arrangement.

In accordance with certain concepts of the novelty of the present invention, it is possible to accommodate a substantial quantity of channels in the exemplified 2700 cycle bandwidth by having the signals modulate the carrier signals relative to a reference carrier signal. By transmitting the reference as well as the signal channels it is possible to accommodate even on-off signals in the signal channels. This arrangement is excellent except for the fact that, when the 2700 cycle band is subdivided into sub-channels separated typically by 100 cycles per second so as to accommodate a typical 20–25 signals, the resulting frequency range for each signal is so small that the Telephone Company oscillator stability is inadequate because of the shifts of frequency and phase that occur. Since this instability is beyond the control of the subscriber to Telephone Company service it has heretofore provided limitation on such additional multiplexing use. By transmitting two reference frequency signals and comparing each signal to one of the references, it is possible to cancel the undesired and variable line phase shift and further, by comparing the two references, it is possible to derive a sub-reference for exact measurement of the signal phase shift which conveys the intelligences.

It is accordingly an object of the present invention to provide a data transmission system capable of transmitting information with a narrow bandwidth in conventional telephone type transmission lines.

Another object of the present invention is to provide a data transmission system in which a reference signal is transmitted in addition to the information signal, the intelligence to be communicated being transmitted as a variable phase difference between the two signals.

Another object of the present invention is to provide a data transmission system in which intelligence is contained as phase differences of signals relative to a reference signal.

Another object of the present invention is to provide a system whereby intelligence available in the form of phase shift of a reference signal can be transmitted together with a signal characteristic of the reference signal, without requiring separate lines for the two signals or encountering interference between the two signals when transmitted in a single line.

Still another object of the present invention is to provide a data transmission system in which intelligence is contained as phase difference of data signals relative to a sub-reference signal and in which the sub-reference signal is derived from the comparison of two reference signals transmitted along with the data signals.

Other objects and many of the attendant advantages of this invention will be readily appreciated as the same becomes better understood by reference to the following detailed description when considered in connection with the accompanying drawings wherein.

When signals are handled in keeping with the foregoing discussion, namely as phase shifts of sub-carrier signals which can include interruption of such carriers and which carriers may be typically only 100 cycles per second apart, careful correlation of such carriers to a reference is required. The reference can be any convenient frequency such as 1000 cycles per second, and each intelligence signal to be transmitted will be impressed as phase shift upon a 1000 cycle per second carrier or upon some carrier synchronized and derived therefrom.

Figures 1, 2, 3:
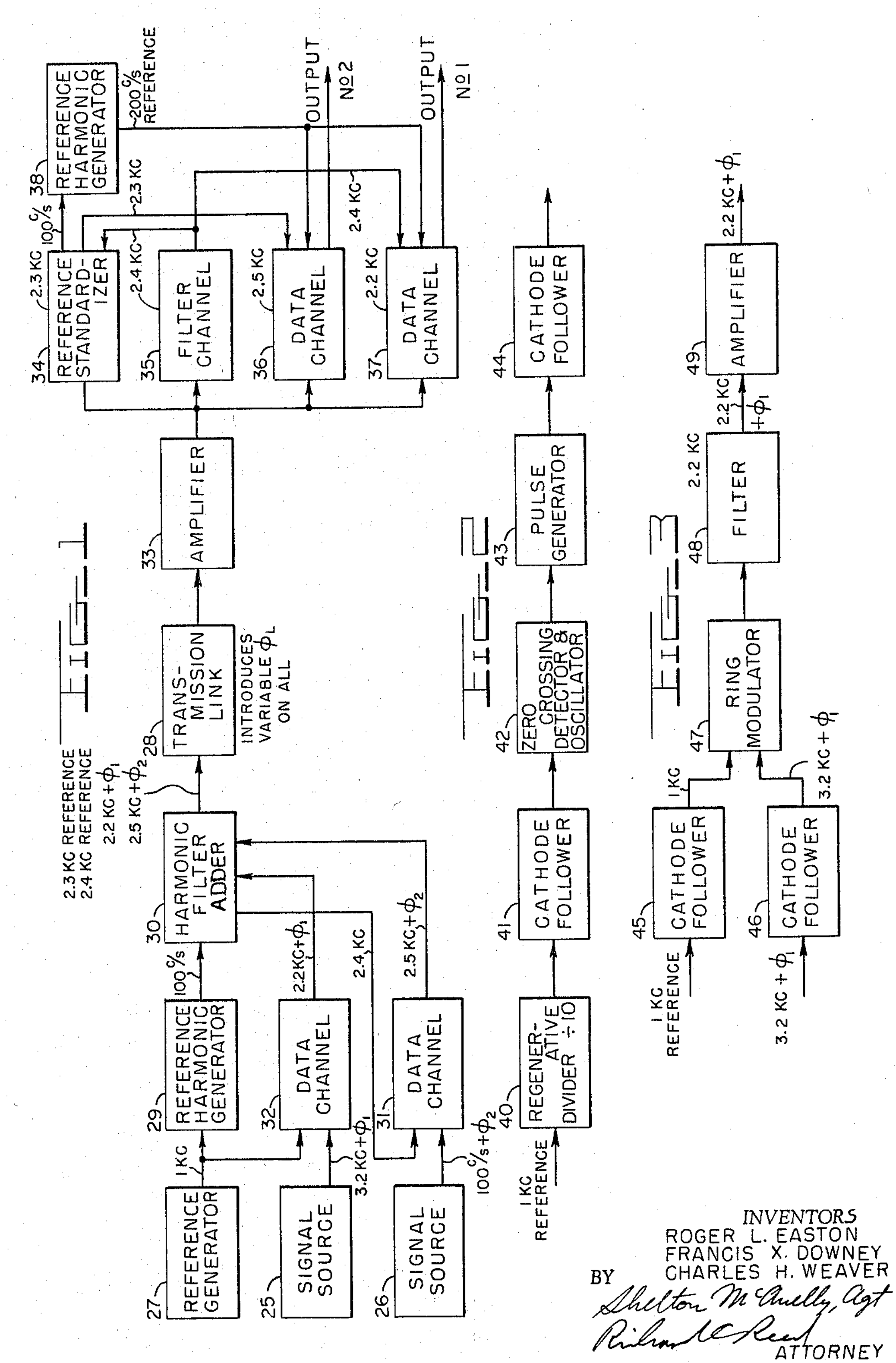
FIG. 1 shows a block diagram of transmitter and receiver apparatus embodying the teachings of the present invention.
FIG. 2 shows in block form details of the reference harmonic generator 29 of FIG. 1.
FIG. 3 shows in block form details of the transmitter data channel 32 of FIG. 1.

With reference now to FIG. 1 of the drawing, a diagram of apparatus constructed in accordance with the teachings of the present invention is shown. This apparatus involves typical first and second signal sources 25 and 26 which are typical of the plurality of signal sources which can be involved in an apparatus as constructed in accordance with the teachings of the invention. In addition to the signal sources 25 and 26 which may produce variational signals characteristic of some information quantity to be transmitted, a third signal source is provided in the form of reference generator 27 which provides a stable reference signal typically at a frequency of 1 kilocycle per second. Intelligence is transmitted basically as carriers which are time modulated, that is phase shifted with respect to this reference signal.

The various reference and intelligence signals are manipulated in frequency by mixing and multiplying to provide signals having phase modulated components for each submultiplexed quantity to be transmitted on transmission link 28. To this end, the reference generator 27 is connected through reference harmonic generator 29, which produces a harmonically rich 100 cycle per second output, to the harmonic filter and mixer 30. Harmonic filter and mixer 30 derives from this 100 cycle signal 2.3 and 2.4 kc. reference signals, both of which are applied to the transmission link 28. Further, the 2.4 kc. reference signal is applied to data channel 31 for combination with the signal from source 26. Signal source 26 is therefore connected to data channel 31 and a second data channel 32 is connected to the reference generator 27 and to signal source 25 for production of a second signal to be transmitted. The signal from signal source 25 may typically be at the frequency of 3.2 kc. containing a variable phase component indicated to be $\phi_1$. It is, of course, obvious that other frequencies for signal source 25 could be selected as exemplified by the 100 cycle frequency of signal source 26 which contains the variational phase signal $\phi_2$. In data channel 32 the signal of signal source 25 is typically altered to a frequency of 2.2 kc. containing the variational component $\phi_1$ whereas data channel 31 provides alteration of the signal of source 26 to a frequency of 2.5 kc. per second, likewise containing a variational signal, $\phi_2$ in this instance. The harmonic filter and mixer 30 combines the 2.2 kc. $\phi_1$ signal from data channel 32, the 2.5 kc. $\phi_2$ signal from data channel 31, and the 2.3 kc. and 2.4 kc. reference signals for transmission by the link 28. Thus transmission link 28 receives the typical 4 signals at the frequencies of 2.2, 2.3, 2.4 and 2.5 kc.

At the reception end of the transmission link the signals can be altered in frequency or varied in phase by some indeterminate, variable amount $\phi_L$ introduced by operation of the link 28. The received signal is first applied to amplifier 33 which can, of course, be any suitable device for accepting the transmitted composite of signals, matching the impedance of the transmission link if such is desired, and imparting suitable amplitude and power to drive the balance of the apparatus connected thereto. This connected apparatus includes 4 basic channels; the reference standardizer 34, which operates in response to the 2.3 kc. reference signal transmitted; the filter channel 35, which operates in response to the 2.4 kc. reference signal transmitted; data channel 36, which responds to the 2.5 kc. intelligence containing signal; and data channel 37, which responds to the 2.2 kc. intelligence containing signal. Each of these four channels is frequency selective to select the desired frequency as indicated, and in additional, perform certain other manipulations to signals to obtain a desired end result.

Data channel 36 combines the 2.5 kc. signal containing $\phi_2$ and the indeterminate unavoidable quantity $\phi_L$ introduced by the transmission link with the 2.3 kc. reference signal also containing the $\phi_L$ quantity to derive a difference signal of 200 cycles per second containing $\phi_2$ but with the $\phi_L$ cancelled out.

Similarly data channel 37 combines the 2.2 kc. signal containing $\phi_1$ and $\phi_L$ with the 2.4 kc. reference signal containing $\phi_L$ to obtain cancellation of $\phi_L$ and an output at 200 cycles containing $\phi_1$.

Reference standardizer 34 operative in response to the 2.3 kc. reference signal containing the unavoidable $\phi_L$ and the 2.4 kc. reference signal also containing the unavoidable $\phi_L$, produces a 100 cycle per second signal with $\phi_L$ cancelled out. Reference harmonic generator 38 connected to the 100 cycle output of 34 produces a 200 cycle reference signal also free of $\phi_L$ which is combined with the $\phi_1$ and $\phi_2$ containing 200 cycle signals of 37 and 36, respectively, to obtain $\phi_1$ and $\phi_2$.

Additional channels are accommodated with the apparatus of FIG. 1 without transmitting additional reference signals. Such is accomplished by selecting suitable frequencies from harmonic filter 30 which when mixed in additional data channels similar to 31 and 32 with signals from other sources produce other signal frequencies such as 2.6 kc., 2.7 kc., 2.1 kc., etc. each containing some intelligence signal as a variational $\phi$.

At the receiver end, additional data channels tuned to the additional transmitter frequencies are provided which operate against the 2.3 kc. or 2.4 kc. references to produce cancellation of $\phi_L$ at a suitable sub-reference frequency, say 300 cycles for 2.6 kc. operation against 2.3 kc. reference, or 2.7 kc. against 2.4 kc. or even at 200 cycles sub-reference for 2.6 kc. against 2.4 kc. reference. The 300 cycle sub-reference is derived from reference harmonic generator 38 by additional filters and amplifiers.

Using this basic arrangement it is apparent that a substantial quantity of channels is provided and that cancellation of the variable $\phi_L$ is readily accomplished.

With reference now to FIG. 2 of the drawing, the apparatus shown therein indicates in typical simplified block diagram individual components of a reference harmonic generator such as 29 of FIG. 1. It is believed that the individual components are self-explanatory as regards FIG. 2, this structure containing a regenerative frequency divider by a factor of 10 identified by the reference character 40 with a cathode follower impedance transformation and isolation device 41 connected to the divider 40. Connected to the cathode follower 41 is a zero crossing detector and oscillator 42 which primarily includes a locking oscillator sort of device for producing short duration pulses at the operative frequency of 100 cycles per second as determined by the division factor of 10 in the regenerative divider 40 from the input 1 kc. reference signal. The detector and oscillator 42 applies signals to the pulse generator 43 which are synchronized to the zero voltage crossing point of the output of divider 40 and causes the production by 43 of a signal rich in harmonic content being typically a 0.2 millisecond duration pulse recurrent at the 100 cycle per second rate. For impedance transformation and isolation the pulse generator 43 is followed by a cathode follower 44.

With reference now to FIG. 3 of the drawing, typical details of the transmitter data channels such as 32 of FIG. 1 are shown. This particular channel includes input cathode followers 45 and 46, connected respectively to the 1 kc. reference generator 27 and to the 3.2 kc. signal source 25. The 1 kc. output of cathode follower 45 and the 3.2 kc. plus $\phi_1$ phase variational signal in the output of the cathode follower 46 are applied to ring modulator 47. Filter 48 connected to the output of modulator 47 selects the 2.2 kc.$+\phi_1$ modulation component and delivers it to amplifier 49 to constitute the output from data channel 32.

Figure 4:
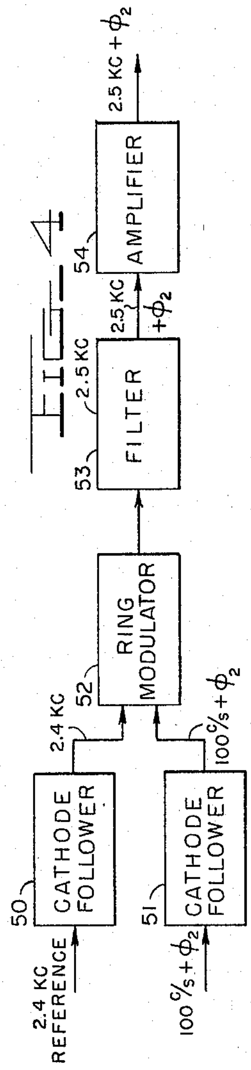
FIG. 4 shows in block form details of the transmitter data channel 31 of FIG. 1.

The structure of the apparatus of FIG. 4 is virtually a duplicate of that of FIG. 3, however it is proportioned somewhat differently to accommodate the slightly different frequency of signals involved in the typical illustration. Since an input signal frequency for the second signal source 26 was typified as 100 cycles per second, a 2.4 kc. reference signal was chosen so that a basic signal frequency for transmission of 2.5 kilocycles, differing by 300 cycles from that of data channel 32, is available. Actually in some instances it is desirable to synchronize the 3.2 kc. frequency of source 25 and the 100 cycle frequency of source 26 to the basic 1000 cycle signal of reference generator 27. Data channel 31 contains cathode followers 50 and 51 the former being connected to the 2.4 kc. reference components of the harmonic filter-mixer 30, the latter being connected to the 100 cycle per second source of intelligence to be transmitted. As with the apparatus of FIG. 3, these two cathode followers are connected to a ring modulator (52 in this instance) which in turn is connected to filter 53, the latter being tuned to 2.5 kilocycles per second to select that component of the output of the modulator 52 (2.5 kc.$+\phi_2$). The frequency selected signal in the output of filter 53 is amplified by a suitable amplifier 54 and applied to the harmonic filter and mixer 30 as shown in FIG. 1.

Figure 5:
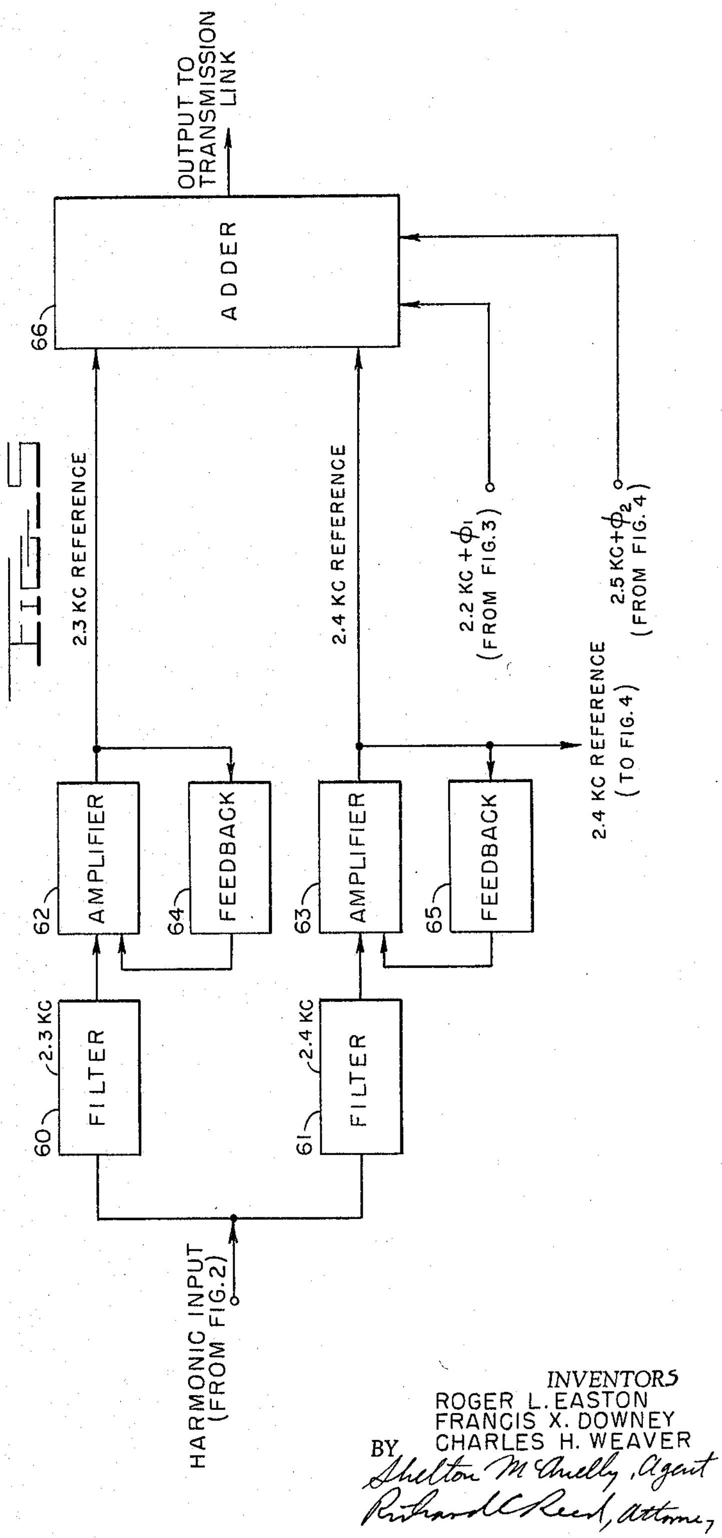
FIG. 5 shows in block form details of the harmonic filter and mixer 30 of FIG. 1.

With reference now to FIG. 5 of the drawing, the apparatus shown therein illustrates typical configuration of the harmonic filter and mixer 30 of FIG. 1. The harmonically rich 100 cycle per second signal from the reference harmonic generator 29 of FIG. 1 constitutes the input to the apparatus of FIG. 5, and is applied to filter 60 tuned to 2.3 kilocycles and filter 61 tuned to 2.4 kilocycles per second. These filters select the specified components in the output of the harmonic signal and apply them to corresponding amplifiers 62 and 63. Feedback for each of the amplifiers 62 and 63 is indicated by appropriate blocks 64, 65. Thus the outputs of the amplifiers 62 and 63 constitute the 2.3 kilocycle reference signal and the 2.4 kilocycle reference signal which are applied to adder 66 together with the 2.4 kilocycle $+\phi_1$ signal from data channel 32 and the 2.5 kilocycle $+\phi_2$ signal from data channel 31. These four signal inputs to adder 66 are combined to where each is present in the adder output in substantially the same proportion for delivery to the transmission link 28 of FIG. 1. It is observed that the 2.4 kilocycle reference signal is also supplied from the apparatus of FIG. 5 to the apparatus of FIG. 4 being the signal applied to cathode follower 50 of said FIG. 4.

Figures 6, 7, 8, 9, 10:
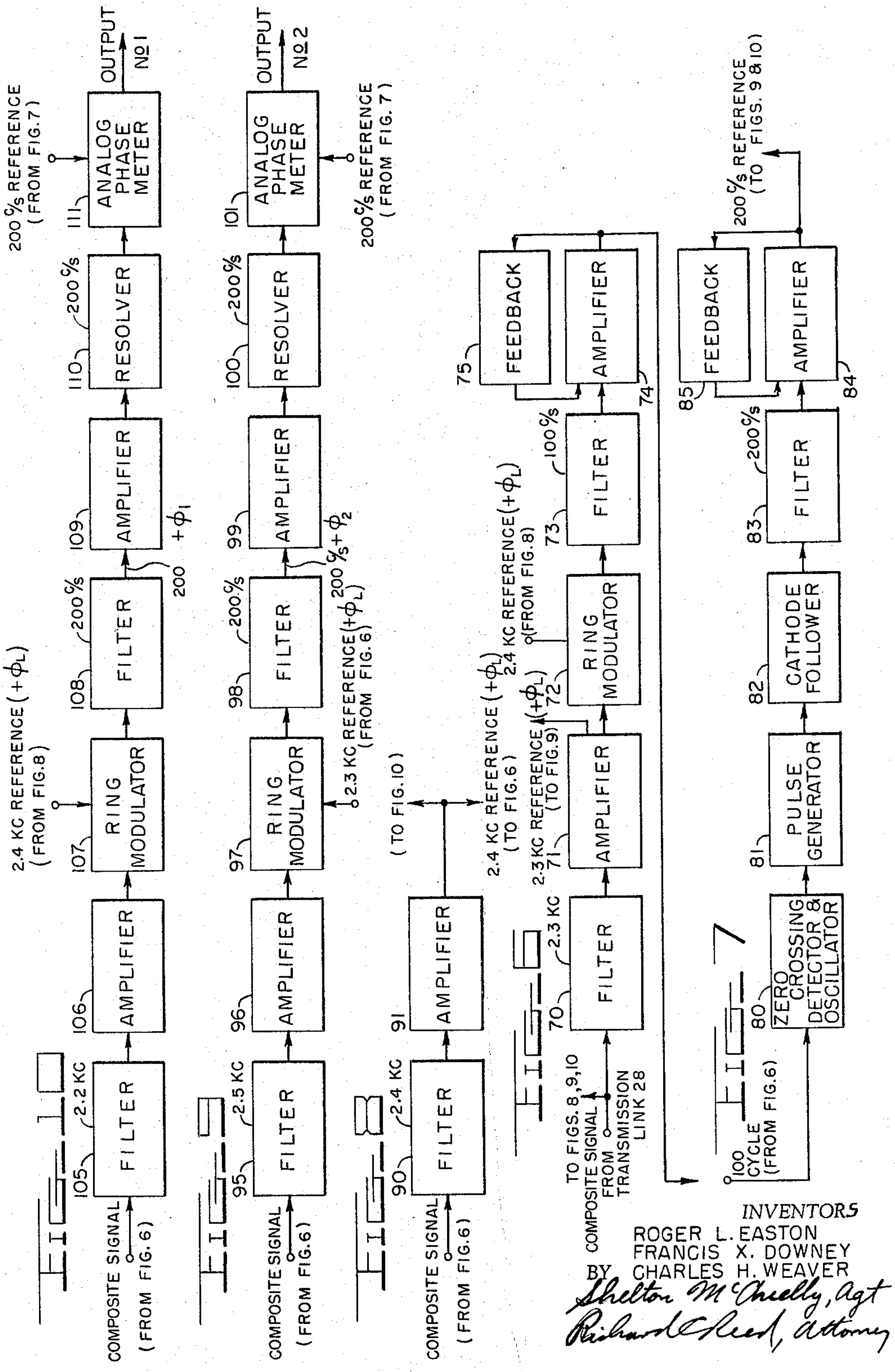
FIG. 6 shows in block form details of the reference standardizer 34 of FIG. 1.
FIG. 7 shows in block form details of the reference harmonic generator 38 of FIG. 1.
FIG. 8 shows in block form details of the filter channel 35 of FIG. 1.
FIG. 9 shows details of the data channel 36 of FIG. 1.
FIG. 10 shows details of the data channel 37 of FIG. 1.

Details of the receiver portion of the apparatus of FIG. 1 are shown in FIGS. 6, 7, 8, 9 and 10 which are contained together on a single sheet of the drawings. Details of the reference standardizer 34 are shown in FIG. 6 to which attention is now directed. The composite signal from the data transmission link 28 as amplified by amplifier 33 and including the undesired $\phi_L$ is applied to filter 70 which is tuned to the 2.3 kilocycle reference frequency. Filter 70 is connected to amplifier 71 which in turn is connected to ring modulator 72 and to FIG. 9 subsequently to be described. Ring modulator 72 is also connected to a source of 2.4 kilocycles $+\phi_L$ reference signals obtained from FIG. 8 which is to be described. The 100 cycle beat between the 2.3 kilocycle $+\phi_L$ reference signal and the 2.4 kilocycle $+\phi_L$ reference signal is selected by filter 73 connected to modulator 72 and applied to amplifier 74. The $\phi_L$'s cancel out in this arrangement. Amplifier 74 is provided with negative feedback indicated in general by block 75. The 100 cycle signal output from amplifier 74 is applied to FIG. 7 to which attention is now directed.

The first component of reference harmonic generator 38 shown in FIG. 7 is a zero crossing detector and oscillator 80 which provides a signal keyed to the zero crossing point on the output signal of amplifier 74 to control the operation of pulse generator 81 connected to the oscillator portion of 80. Pulse generator 81 provides a signal of rich harmonic content consisting of a 0.2 millisecond duration pulse at the recurrence frequency of 100 cycles per second which is applied through cathode follower 82 to a filter 83 wherein is selected a 200 cycle per second component of the complex waveform. This 200 cycle per second signal is amplified by a subsequent amplifier 84 provided with negative feedback by a path indicated in general by block 85. The output of amplifier 84 is thus a 200 cycle per second subreference signal which is supplied to the apparatus of FIGS. 9 and 10 subsequently to be described.

FIG. 8 to which attention is now directed contains a filter 90 tuned to 2.4 kilocycles followed by an amplifier 91. Filter 90 receives the composite signal output of amplifier 33 of FIG. 1 and selects from it the 2.4 kilocycle $+\phi_L$ reference signal. This reference signal is amplified and supplied to the ring modulator 72 of FIG. 6 and to ring modulator 107 of FIG. 10 as subsequently described.

FIG. 9 shows data channel 36 of FIG. 1. The first component of this channel is filter 95 tuned to the 2.5 kilocycle signal frequency which is followed by the amplifier 96. Filter 95 selects the 2.5 kilocycle $+\phi_2$ $+\phi_L$ signal in the output of amplifier 33 and amplifier 96 supplies it to ring modulator 97 which latter component also receives the 2,3 kilocycle $+\phi_L$ reference signal from amplifier 71 of FIG. 6 to provide a beat output selected by filter 98 at the frequency of 200 cycles per second. The 200 cycles per second $+\phi_2$ output of filter 98 contains phase modulation in dependency upon the signal of signal source 26 of FIG. 1. This 200 cycle per second signal is amplified by amplifier 99 and applied through resolver 100 to the analog phase meter 101. Analog phase meter 101 receives the 200 cycle per second reference signal from amplifier 84 of FIG. 7 to provide an output in dependency upon the phase variations ($\phi_2$) in the 200 cycle per second $+\phi_2$ signal obtained from filter 98 and delivered through amplifier 99 and resolver 100.

With reference now to FIG. 10, a second structure similar to that of FIG. 9 is shown differing primarily in the tuned frequency of filter 105 which is tuned to a frequency of 2.2 kilocycles, and the source of the reference signals to ring modulator 107, namely, the 2.4 kilocycle $+\phi_L$ reference signal obtained from amplifier 91 of FIG. 8. The output from analog phase meter 111 is also then a signal dependent upon the phase variational component $\phi_1$ in the signal of source 25 of FIG. 1.

Figure 11:
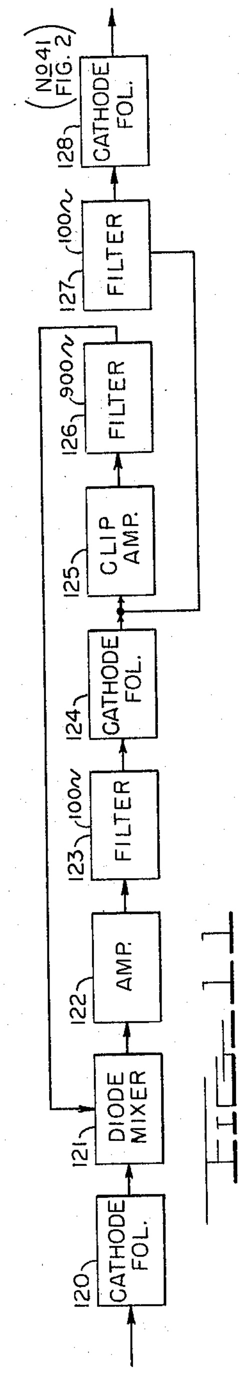
FIG. 11 shows details of typical components of a regenerative divider 40 of FIG. 2.

With reference now to FIG. 11, a block diagram of typical components within the regenerative divider 40 of FIG. 2 is shown. This structure contains the input impedance conversion or isolation device 120 shown as a cathode follower which receives the 1 kilocycle per second reference signal and applies it to a diode mixer 121. Diode mixer 121 is followed by amplifier 122, a filter 123 tuned to 100 cycles per second, cathode follower 124, clipping amplifier 125 and filter 126. The output of the clipper amplifier 125 is rich in harmonic content, the filter 126 being tuned to 900 cycles per second to select that harmonic of the signal. Filter 126 is connected back to diode mixer 121. Thus it is apparent that mixer 121 is supplied with a 1 kilocycle input signal and a 900 cycle input signal so that one of the components of the output thereof is 100 cycles per second which signal is selected by the filter 123. The 100 cycle per second output of filter 123 is supplied through the cathode follower 124 to a second 100 cycle per second filter 127 which in turn is followed by cathode follower output impedance transformation device 128 which is equivalent to component 41 of FIG. 2, being repeated in the drawings merely for convenience in presenting a complete FIG. 11 circuit.

Figure 12:
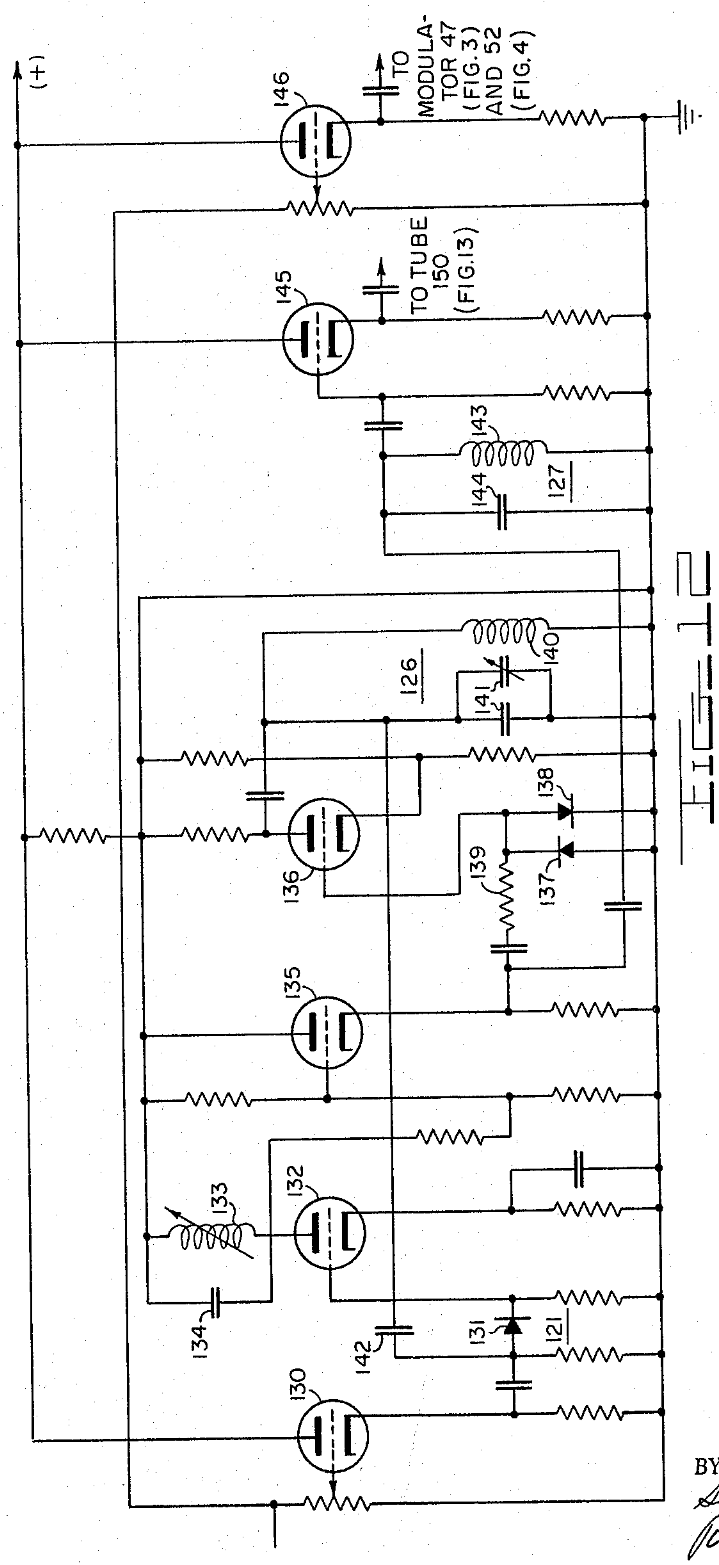
FIG. 12 shows schematic details of the block apparatus of FIG. 11.

With reference now to FIG. 12, circuit details of a typical structure of FIG. 11 are shown. It is believed that with the preceding discussion a brief description of FIG. 12 is adequate. The input cathode follower is indicated in general as the circuitry associated with tube 130, the mixer 121 being the circuitry associated with diode 131. The principal component of amplifier 122 is the electron tube 132 while the filter 123 is composed of the inductance 133 and capacitance 134. Preferably the inductance 133 is adjustable to permit convenient high Q tuning of the filter circuit. Tube 135 is the principal component of cathode follower 124 whereas the clipper amplifier 125 contains tube 136 the grid of which is connected to the cathode follower tube 135 by means of a clipping circuit containing the diodes 137, 138 and limiting resistance 139. Connected to the anode of tube 136 is the filter circuit 126 containing the inductance 140 and various capacitances indicated in general by reference character 141. The tuned circuit of 140 and 141 is adjusted to a frequency of 900 cycles per second. Capacitance 142 is indicated as providing the return signal path to the diode mixer 121 (or 131).

Filter 127 is indicated as containing the components 143 and 144 tuned to the frequency of 100 cycles per second and connected to the grid of tube 145 which is the principal component of cathode follower 128.

For convenience the cathode followers 45 (FIG. 3) and 50 (FIG. 4) are shown in typical structural detail in FIG. 12 namely that circuitry associated with the principal component thereof identified by reference character 146. The 1 kilocycle output of the cathode follower circuit of electron tube 146 is the 1 kilocycle signal supplied to ring modulator 47 of the data channel of FIG. 3 (32 of FIG. 1) and ring modulator 52 of the data channel of FIG. 4 (31 of FIG. 1).

Figure 13:
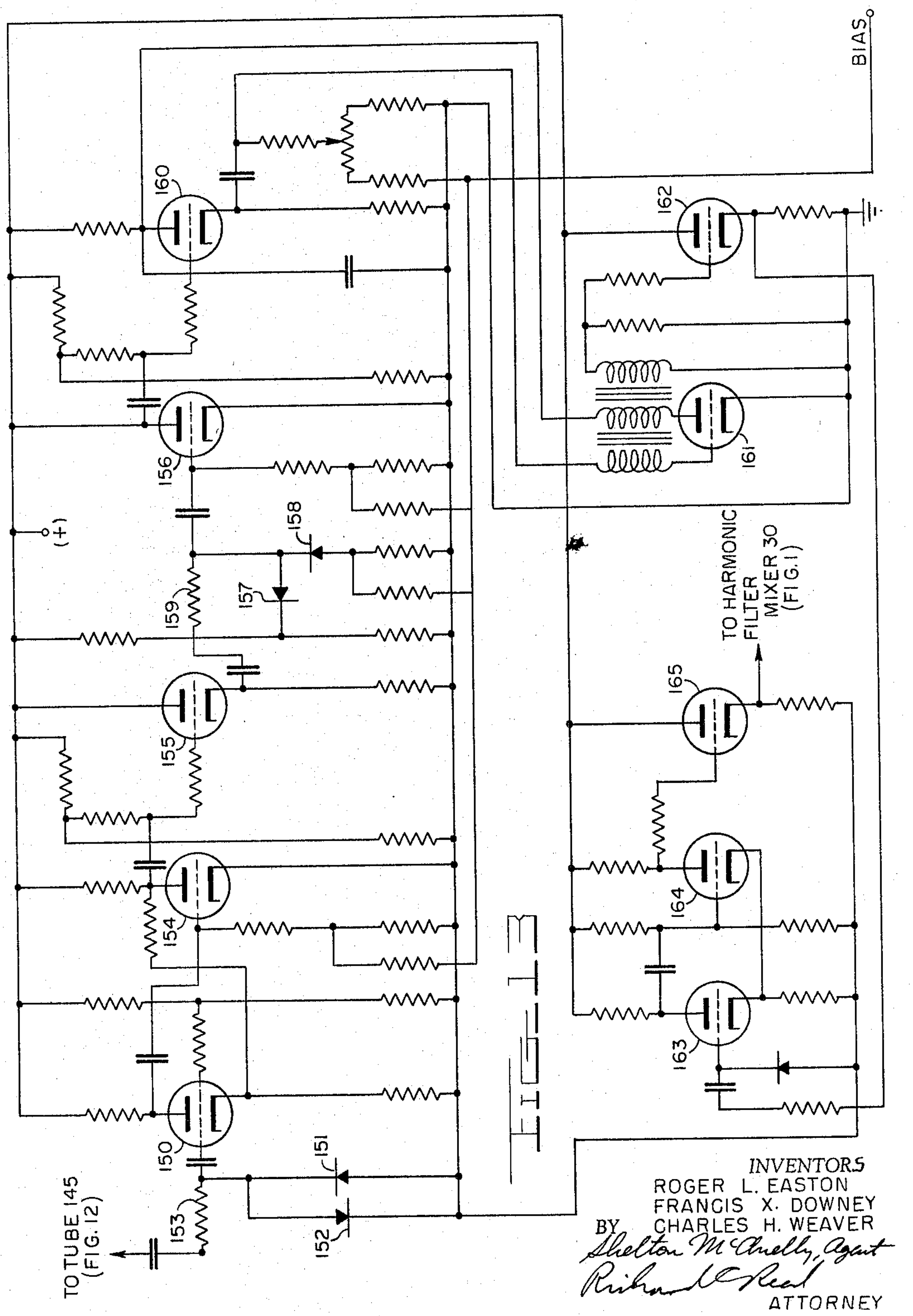
FIG. 13 shows typical schematic details of components 42, 43, and 44 of FIG. 2.

Circuit details of typical circuitry of the zero crossing detector and oscillator 42, the pulse generator 43 and the cathode follower 44 of FIG. 2 are shown in FIG. 13 to which attention is now directed. The 100 cycle per second sinusoidal signal as obtained from the cathode of tube 145 in the apparatus of FIG. 12 is applied to the grid of an electron tube 150 through the clipping circuit containing diodes 151 and 152 and limiting resistance 153. Tube 150 thus receives a square wave signal rich in harmonics. Tube 150 together with tube 154 constitutes a feedback pair type of amplifier which is connected to the grid of tube 155, which is in a cathode follower impedance conversion circuit. The cathode of tube 155 is connected to the grid of tube 156 through a clipping circuit containing the diode elements 157, 158, the limiting resistance 159 and various biasing resistances not identified by specific reference characters. Tube 156 is an amplifier and drives tube 160 which is in a trigger circuit for the blocking oscillator of tube 161.

The peculiar biasing of the clipping arrangement synchronizes the initiation of a pulse of operation of the blocking oscillator 161 with the zero crossing (in one direction) of the substantially sinusoidal waveform which characterizes the 100 cycle per second signal obtained from the cathode of tube 145 of FIG. 12.

The blocking oscillator of tube 161 is connected to a cathode follower circuit of tube 162 while the cathode of tube 162 is connected to the one-shot multivibrator of tubes 163 and 164 which is followed by cathode follower tube 165. The output obtained at the cathode of tube 165 is a pulse of approximately $\frac{2}{10}$ of a millisecond duration and 120 volts peak amplitude occurring at the prescribed recurrence rate of 100 cycles per second.

The foregoing scheme permits a plurality of subchannels to be transmitted through a single telephone or equivalent type of channel of narrow frequency width, typically 2700 cycles. Various arrangements for signal frequencies, reference frequencies and sub-reference frequencies have been discussed. The phase shifts have been exemplified as being of a (+) plus nature however this is merely relative since $\phi_L$ can be positive or negative. As to the signal $\phi$'s these can be negative as well as positive and in some instances as to avoid undesired harmonics of certain signals involved, or interference, certain negative $\phi$'s may be preferable. The double reference and standard sub-reference signal arrangement provides improved cancellation of line phase shift manifesting itself as substantially improved signal-to-noise ratio in the output.

Obviously many modifications and variations of the present invention are possible in the light of the above teachings. It is therefore to be understood that within the scope of the appended claims the invention may be practiced otherwise than as specifically described.

What is claimed is:

1. In a system for transmitting information from one point to another through a single channel,
means for producing first and second related reference signals,
means for producing a plurality of information signals time modulated relative to the reference signals,
means for transmitting said signals between the points,
means for comparing each received information signal with one of the reference signals for obtaining for each information signal a difference frequency signal containing the time modulation information of the respective information signal,
means for comparing the received reference signals to obtain a standard sub-reference signal,
means for deriving a multiple of the standard sub reference signal at substantially the frequency of each of the difference frequency signals when not modulated,
and means for comparing the difference frequency signals with the corresponding multiple of the standard sub reference signal to extract the time modulation information of the original information signal.

2. In a system for transmitting phase modulated multiplexed signals on a transmission channel containing a variable phase shift introducing portion,
means for producing a first reference frequency signal,
means for producing a plurality of phase modulated information signals which are phase related to said reference signal at a frequency different therefrom,
means for producing a second reference signal which is phase related to said first reference frequency signal at a selected frequency difference therefrom,
means for applying said signals to said channel,
means for receiving said signals from said channel,
and means for comparing the difference frequency between one reference and each information signal with a harmonic including unity of the difference frequency between the two reference signals to derive an output signal in dependency on the modulation of each information signal.

3. A data transmission system comprising:
means for combining a plurality of signals;
a reference signal generator, connected to said combining means for producing two, phase related reference signals of different frequencies;
a plurality of data signal sources connected to said combining means for producing a plurality of data signals, each data signal being of a frequency different from said reference signals and the other of said data signals and each data signal being phase modulated with respect to said reference signals and thereby representative of particular data;
receiving means;
transmission means coupled to transmit the signals combined by said combining means to said receiving means,
said transmission means introducing a variable phase shift equally into each of the transmitted combined signals;
said receiving means including filter means coupled to said transmission means to separate said combined reference and data signals;
said receiving means further including reference generator means connected to said filter means to receive said separated reference signals and to recombine said separated reference signals in such a manner as to remove the phase shift introduced by said transmission means and to produce a receiver means reference signal and said receiving means further including a plurality of data channels, each of said data channels being coupled to said filter means to receive a different one of said separated data signal and a separated reference signal and to said reference generator means to receive said receiver means reference signal, each data channel functioning to combine said separated reference signal and said separated data signal in such a manner as to remove the phase shift introduced by said transmission means and to produce a signal representative of the phase difference between the resultant of said combined separated reference and separated data signals and said receiver means reference signal.

References Cited by the Examiner

UNITED STATES PATENTS

| | | | |
|---|---|---|---|
| 2,403,385 | 7/1946 | Loughlin | 179—15 |
| 2,480,875 | 9/1949 | O'Brien | 179—15 |
| 2,760,132 | 8/1956 | Pawley | 179—15 |

DAVID G. REDINBAUGH, *Primary Examiner.*

J. TERRY STRATMAN, *Assistant Examiner.*